United States Patent

[11] 3,529,508

[72] Inventor James D. Cooksey
 4132 Baldwin Ave., Culver City, California 90230
[21] Appl. No. 813,399
[22] Filed March 26, 1969
[45] Patented Sept. 22, 1970

[54] PLASTIC SCREW FASTENER COMBINATION
 7 Claims, 12 Drawing Figs.
[52] U.S. Cl. .................................................. 85/53
[51] Int. Cl. ........................................... F16b 15/02,
 F16b 23/00
[50] Field of Search .......................................... 85/53, 55,
 1JP, 35; 215/47, 48

[56] References Cited
 UNITED STATES PATENTS
3,425,313 2/1969 Villo ............................. 85/53

FOREIGN PATENTS
390,471 4/1933 Great Britain ............. 215/47
678,839 9/1952 Great Britain ............. 85/53
920,221 3/1963 Great Britain ............. 85/55
948,934 2/1964 Great Britain ............. 85/53

Primary Examiner—Ramon S. Britts
Attorney—Jessup and Beecher

ABSTRACT: An improved plastic accessory for a socket head cap screw, such as a knurled knob, cover, or the like, which is attached to the head of the cap screw; this being achieved without the requirement for insert molding or adhesives, and without the necessity of any special tools. The plastic accessory is provided with a hub portion which is sheared by the edges of the socket in the screw head to a shape and size corresponding to those of the socket.

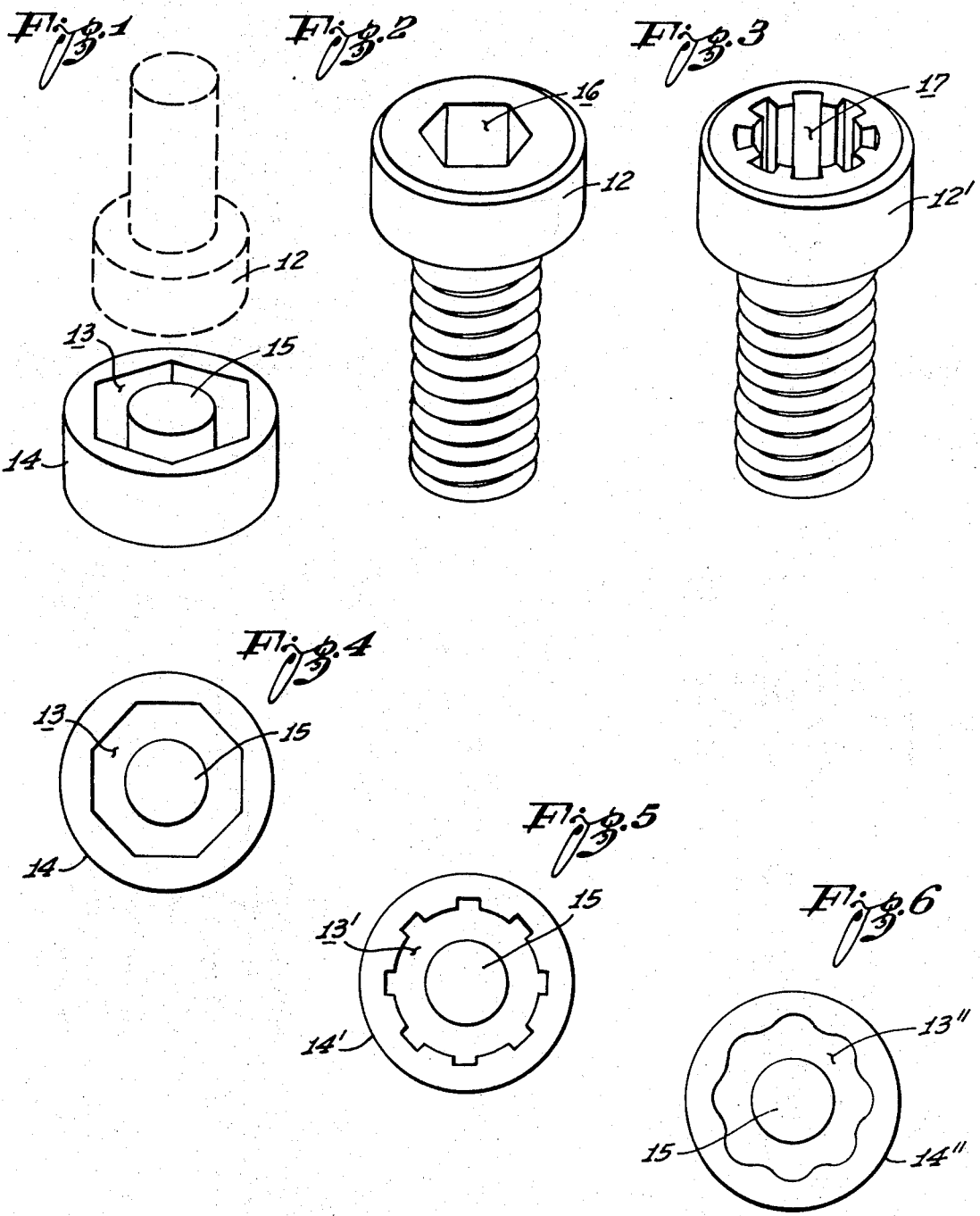

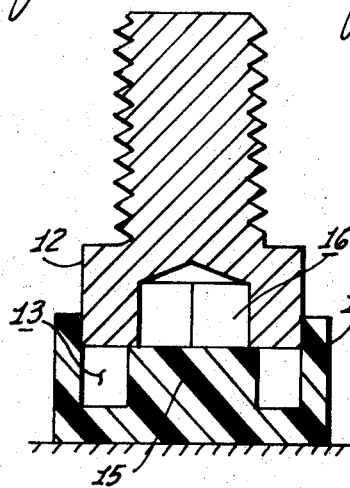
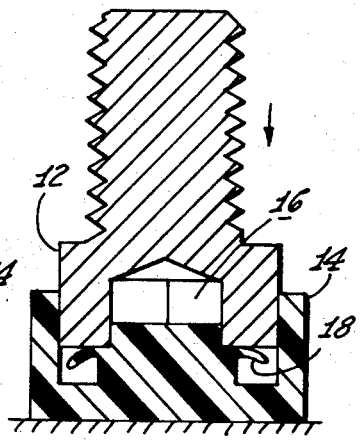
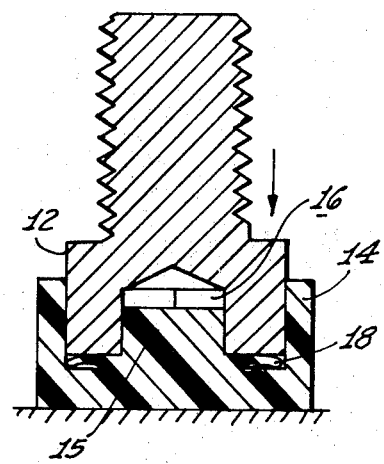
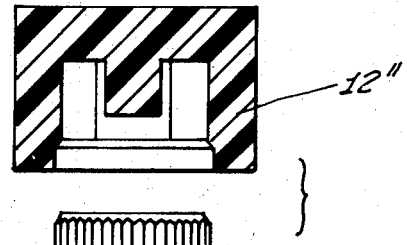
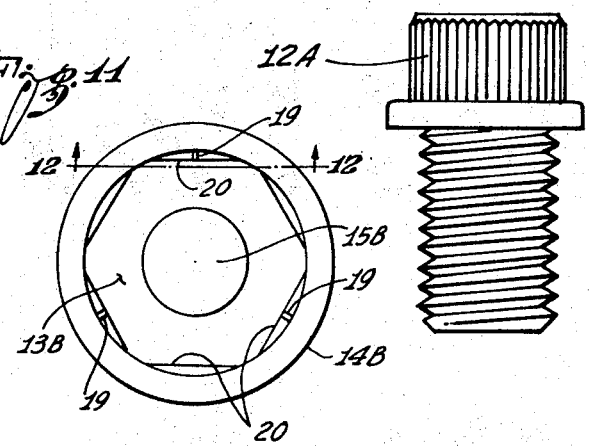
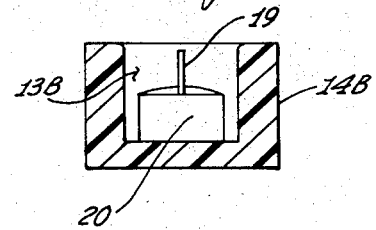

PLASTIC SCREW FASTENER COMBINATION

BACKGROUND OF THE INVENTION

It is often desired that the head of a socket head cap screw be covered with a plastic accessory. This plastic accessory, for example, may take the form of a knurled knob to permit the screw to be tightened or removed into or out of an associated member by hand. Alternatively, the plastic accessory may take the form of a dial, insulator, protector, leg, thumb screw, decorative cover, or the like, for various known types of screws and bolts.

The combination of a screw and a plastic accessory, such as described in the preceding paragraph, is known to the art. However, prior to the concept of the present invention, there does not appear to be any simple and inexpensive technique for attaching the plastic accessory to the head of the screw. The plastic accessories of the prior art were usually molded to the head of the screw, or were adhesively attached thereto. In the case of the molded accessory of the prior art, for example, unless large quantities of the screw-accessory combinations were required for a particular thread size and screw length, the price of the prior art structures was usually prohibitive.

In addition to the cost factor, the plastic accessory, to be useful, must be held securely on the head of the screw, and it usually must be able to withstand the torque required to tighten or loosen the screw from the associated member, and to transmit the torque to the screw. The mechanical torque requirements of the plastic accessory have been met to some extent in the prior art by cementing or molding the plastic accessory to the screw or screw head. However, as also pointed out, the prior art techniques are expensive, and they require special tooling and equipment.

The improved structural combination of the present invention is such that the plastic accessory may be easily and inexpensively attached to the head of a socket head cap screw, without the need for adhesives or for any special tooling. Moreover, a plastic accessory constructed in accordance with the teaching of the present invention may be used, without cracking or shearing, in conjunction with screw heads of a range of dimension and concentricity tolerances.

In the accessory-screw combination, resulting from the practice of the present invention, the plastic accessory is firmly, rigidly and securely attached to the head of the screw. In addition, the plastic accessory is capable of transmitting the required torque to the screw for tightening or loosening the screw, as required.

As noted above, the plastic accessory of the invention compensates for usual ASA dimensional and concentricity tolerances without exhibiting any tendency to crack or otherwise fail. For example, a #8 American Standard hexagonal socket head cap screw (ASA B18 3—1947) has a head diameter which may vary from .265 inches to .270 inches, and it has a hexagonal width that may vary from .125 inches to .127 inches. Also, the concentricity of the socket in the hexagonal socket head cap screw, or in the fluted head cap screw with respect to the head diameter tends to vary somewhat from screw to screw.

The plastic accessory of the present invention is constructed to have a retaining socket which receives the head of the screw in a tight press fit. The retaining socket, as will be described, is preferably shaped in a selected geometrical design to allow the plastic of the accessory to expand and react resiliently against the head of the screw to hold the head firmly in the socket. The plastic accessory of the invention is further constructed to have a central hub which is positioned essentially coaxially with the socket in the accessory, and which extends into the socket in the head of the screw as the screw head is inserted into the accessory socket. The accessory hub, for example, may originally be circular in cross-section, and it is sheared by the hexagonal sides or flutes of the socket head cap screw during the assembly operation.

It will be appreciated, therefore, that the plastic accessory of the present invention may be made to accommodate different dimensions encountered in a corresponding screw head within the normal range of tolerances, and still be effective. Moreover, the shearing action on the central hub of the accessory is such that deviations in concentricity of the screw heads can be tolerated. It will be appreciated that a quantity of plastic accessories may be made in accordance with the practice of the invention of a selected uniform size, and these may be fitted easily and simply, as required, on the heads of the cap screws, so that any number of screws of any desired length or thread size may be equipped with the plastic accessory, as needed.

To assemble the accessory on the head of a cap screw, there is no need for the screw head to be precisely aligned and centered with respect to the accessory. The screw head is merely inserted into the accessory retaining socket, and the accessory is forced down over the head by means, for example, of a hammer. During this operation the screw head socket shears the center hub of the accessory to shape, and the screw head is received resiliently and in a press fit in the retaining socket in the accessory. Therefore, deviations of the screw head from true concentricity may be tolerated within usual tolerance limits, as may dimension deviations of the screw head, as described above.

The plastic accessories of the invention, for example, may be formed of thermosetting or thermoplastic resin, preferably the latter. Alternately, the accessories may be formed of acetal, nylon, polycarbonate plastic, polystyrene plastic, or other suitable plastic materials capable of being sheared in a manner to be described and of exhibiting some measure of resiliency.

BRIEF DESCRIPTION OF THE DRAWINGS

FIG. 1 is a perspective view of the plastic accessory, together with a phantom representation of a typical socket head cap screw;

FIG. 2 is a perspective of a hexagonal type socket head cap screw;

FIG. 3 is a perspective view of a fluted type socket head cap screw;

FIG. 4 is a bottom view of the plastic accessory of the invention with a retaining socket having a polygon geometrical configuration;

FIG. 5 is a bottom plan view of the plastic accessory modified to have a fluted type of retaining socket;

FIG. 6 is a bottom view of the plastic accessory further modified to have a retaining socket shaped as a series of arcs;

FIG. 7 is a side section of a socket head cap screw with its head inserted into the retaining socket of an accessory constructed in accordance with the invention;

FIG. 8 is a section similar to FIG. 7, and showing the cap screw as it enters further into the retaining socket of the accessory in shearing relationship with the central hub of the accessory;

FIG. 9 is a section like FIGS. 7 and 8, and showing the cap screw and the plastic accessory in a completely assembled condition;

FIG. 10 is a view, partly in section, of a modified cap screw-accessory combination;

FIG. 11 is a bottom view of a further modified plastic accessory incorporating the teaching of the invention; and FIG. 12 is a section along the line 12—12 of FIG. 11.

DETAILED DESCRIPTION OF THE ILLUSTRATED EMBODIMENTS

As shown in the drawings, the plastic accessory of the present invention may be mounted, for example, on a head of the hexagon socket head cap screw such as designated 12 in FIG. 2; or onto the head of a fluted socket head cap screw such as designated 12' in FIG. 3. The plastic accessory of the invention is desgnated 14 in FIG. 1, and it includes a retaining socket 13.

The retaining socket 13 could have a circular configuration and of a selected diameter to form a true press or fit with the head of the cap screw; or it may have a geometrical shape, such as shown in FIGS. 4, 5 and 6, so as to provide an interrupted contact with the peripheral surface of the head 12 or 12' of the associated cap screw. This is in order to provide a resilient engagement between the wall of the plastic accessory and the peripheral surface of the head of the cap screw. The geometrical design of the retaining socket of the plastic accessory may, for example, be of the type illustrated in FIGS. 4, 5 and 6, and designated therein as 13, 13' and 13'', the various plastic accessories in FIGS. 4, 5 and 6 being designated 14, 14' and 14'', respectively.

With the geometrical design of the retaining socket 13, 13' or 13'' of the plastic accessory, a greater amount of resilient movement of the plastic accessory is possible, so that the accessory may be used in conjunction with the heads of cap screws with a relatively wide range of tolerances, without causing cracking or shearing of the wall of the accessory. As mentioned above, the geometrical shape further enhances the resilient characteristic of the plastic accessory, so as to create a relatively high radial inward pressure for retaining the accessory in place on the head of the cap screw.

As mentioned above, the plastic accessory 14 also has a central hub 15. The hub 15 is formed integral with the bottom surface of the retaining socket 13, and it should have a height somewhat less than the depth of the retaining socket, as shown in FIG. 7, for example. The hub 15 serves several functions in retaining the plastic accessory 14 on the head of the cap screw.

As best shown in FIGS. 7, 8 and 9, when the plastic accessory 14 is forced into place over the head of the cap screw by means, for example, of a hammer, the hub 15 is sheared into the shape of the hexagon socket 16, for example, in the head of the cap screw of FIG. 2, or of the fluted socket 17, for example, in the head of the cap screw of FIG. 3. In this way, the screw head socket actually forms itself into the hub of the plastic accessory, without regard for absolute concentricity between the screw socket and its corresponding screw head.

The fact that the screw head 12 is first fitted into the accessory retaining socket 13, as shown in FIG. 7, eliminates the need for radial alignment between the screw socket and the hub 15, and it also takes care of dimension tolerances in the screw socket. Once assembled, the central hub 15 of the plastic accessory helps to retain the accessory on the screw head 12 or 12'. However, the most important function of the hub 15 is to withstand the torques created as the accessory is turned to tighten or loosen the screw.

To facilitate the assembly operation, the retaining socket 13 may be flared slightly, so as to permit the screw head 12 to be inserted down into the accessory socket 13 until contact is made with the top of the hub 15. Then, the necessary pressure is applied to force the head to the bottom of the socket, through the steps shown in FIGS. 8 and 9. As best seen in FIG. 8, a chip 18 is produced from the hub 15 during the assembly operation, and this chip is trapped between the top of the screw head and the bottom of the socket 13, as best shown in FIG. 9. The amount of space required for the chip 18 is predetermined, and allowances are made for the chip in the design of the retaining socket 13.

In some cases the screw head 12 may be knurled, as shown at 12A in FIG. 10. The knurling operation makes the unknurled portion at the base of the screw head of larger diameter than the diameter of the knurled portion. Then, when such a head is into retaining socket 13, 13', or 13'', of the accessories described above in conjunction with FIGS. 4, 5 and 6, the larger diameter portion of the screw head tends to over expand the retaining socket and thereby defeats the holding spring action thereof which must be exerted on the knurled portion of the screw head.

For the reason explained in the preceding paragraph, the retaining socket 13A in the accessory 14A is provided with a hub 15A and with an increased diameter portion adjacent its mouth, as shown in FIG. 10. This increased diameter portion has a length corresponding to the length of the unknurled portion of the screw head, so that the unknurled portion may be received in the socket of the accessory without over expanding the socket and without affecting its resilient holding capabilities on the knurled portion of the screw head. The enlarged diameter portion at the mouth of the accessory socket in FIG. 10 also serves to assist in guiding the head of the cap screw into proper alignment in the retaining socket in the accessory.

The plastic accessory 14B of FIGS. 11 and 12 includes a socket 13B, the upper part of which is of circular cross-section of a diameter larger than the largest head 12. The lower part of the socket 13B may have a hexagonal shape 20, as in the embodiment of FIGS. 1 and 4. Small alignment ribs 19 are provided adjacent the wall of the upper part of the socket 13B to center the screw head 12 during pre-assembly despite tolerances. The smaller head diameters will be guided by the ribs 19 and the larger head diameters will shear the ribs to size.

The invention provides, therefore, an improved plastic accessory for a screw head, and one which can be applied to the head simply and conveniently, and without the need for any special tools. The accessory is constructed so as to be rigidly and firmly retained on the screw head, and in that it can be turned to apply torque to the screw without cracking or otherwise damaging the accessory.

I claim:

1. In combination, a plastic accessory and a socket head cap screw having a non-circular socket in the head thereof, said accessory having a retaining socket therein and the head of said cap screw extending into said accessory retaining socket, and said accessory further having a hub in said accessory retaining socket in essentially coaxial relationship therewith and extending into a shearing relationship into the socket in the head of said cap screw, in which said hub is sheared to a shape and size corresponding to the shape and size of the socket in the head of said cap screw.

2. The combination defined in claim 1, in which said socket in the head of said cap screw has a hexagonal shape.

3. The combination defined in claim 1, in which said socket in the head of said cap screw has a fluted shape.

4. The combination defined in claim 1, and which includes a sheared chip portion of said hub interposed in said accessory retaining socket between the top of the head of said cap screw and the bottom of said accessory retaining socket.

5. The combination defined in claim 1, in which the wall of said accessory retaining socket has a selected geometrical shape and is expanded radially outwardly by the head of said cap screw.

6. The combination defined in claim 5, in which said accessory is formed of a resilient plastic material and resiliently engages the head of said cap screw.

7. The combination defined in claim 1 and which includes alignment ribs in said retaining socket adjacent the wall thereof and engaging the peripheral surface of the head of said screw.